United States Patent
Chen et al.

(10) Patent No.: US 11,143,361 B2
(45) Date of Patent: Oct. 12, 2021

(54) RAIL BRACKET

(71) Applicant: SHENZHEN YINGLU TECHNOLOGY DEVELOPMENT CO., LTD, Shenzhen (CN)

(72) Inventors: Guozheng Chen, Shenzhen (CN); Bilan Pan, Shenzhen (CN)

(73) Assignee: SHENZHEN YINGLU TECHNOLOGY DEVELOPMENT CO., LTD, Shenzhen (CN)

( * ) Notice: Subject to any disclaimer, the term of this patent is extended or adjusted under 35 U.S.C. 154(b) by 0 days.

(21) Appl. No.: 16/928,026

(22) Filed: Jul. 14, 2020

(65) Prior Publication Data
US 2021/0054964 A1 Feb. 25, 2021

(30) Foreign Application Priority Data
Aug. 20, 2019 (CN) .......................... 201910766482.4

(51) Int. Cl.
*F16M 13/02* (2006.01)
*F16B 2/06* (2006.01)
*F41G 11/00* (2006.01)

(52) U.S. Cl.
CPC ........... *F16M 13/022* (2013.01); *F16B 2/065* (2013.01); *F41G 11/003* (2013.01)

(58) Field of Classification Search
CPC ..... F16M 13/022; F41G 11/003; F41A 35/00; F41A 23/08; F16B 2/065; F16B 2/04; F16B 11/00
See application file for complete search history.

(56) References Cited

U.S. PATENT DOCUMENTS

| | | | | |
|---|---|---|---|---|
| 7,222,451 | B2 * | 5/2007 | Keng | F41A 23/08 42/127 |
| 7,409,791 | B2 * | 8/2008 | Moody | F41A 23/08 248/171 |
| 9,448,035 | B2 * | 9/2016 | Wilson | F41G 11/003 |
| 9,677,854 | B1 * | 6/2017 | Tran | F41G 11/003 |
| 10,907,937 | B1 * | 2/2021 | Keng | F41G 11/003 |
| 2010/0018101 | A1 * | 1/2010 | Moody | G03B 17/561 42/72 |
| 2010/0205795 | A1 * | 8/2010 | Moody | F41A 23/08 29/428 |

* cited by examiner

*Primary Examiner* — Tan Le

(57) ABSTRACT

A rail bracket includes a bracket body, a first screw, and a buckle board, wherein, a slot is provided at a side of the bracket body, the bracket body protrudes to form a body buckle at a first side of the slot, a through hole is provided at a side wall of the bracket body, one end of the buckle board is inserted into the slot, the first screw inside the through hole threadedly connects with the buckle board, the body buckle is provided with a first rail clamping groove, the buckle board is provided with a second rail clamping groove, the rail bracket clamps with a rail. It is easy to operate the first screw from the side so that the rail bracket is clamped onto the rail to realize connection between the rail and a part.

2 Claims, 2 Drawing Sheets

RAIL BRACKET

TECHNICAL FIELD OF THE DISCLOSURE

The disclosure relates to the technical field of mounting bracket, in particular to a rail bracket.

BACKGROUND OF THE DISCLOSURE

In the prior art, it needs to stall an additional component on a part with a rail. For example, Picatinny rail is a kind of standard rail. However, an adapter is required in order to install other components into a slot of Picatinny rail. Further, when a T-shaped fixture block of the adapter matched with the slot is clamped on the Picatinny rail, the T-shaped fixture block needs to be adjusted to make it chuck with the slot through an adjustment nut above the adapter. However, due to the influence of length and width of rail, if the aiming glass, flashlight, or other related equipment on the adapter are large, it is not convenient to operate and adjust the adjustment nut.

SUMMARY OF THE DISCLOSURE

The purpose of the disclosure is to provide a rail bracket, which is intended to solve at least one problem raised in the background of the disclosure.

The embodiment of the disclosure is implemented in this way, a rail bracket includes a bracket body, a first screw, and a buckle board, wherein, a slot is provided at a side of the bracket body, the bracket body protrudes to form a body buckle at a first side of the slot, a through hole is provided at a side wall of the bracket body, one end of the buckle board is inserted into the slot, the first screw inside the through hole threadedly connects with the buckle board, the body buckle is provided with a first rail clamping groove, the buckle board is provided with a second rail clamping groove, the rail bracket clamps with a rail to be installed through the first rail clamping groove and the second rail clamping groove, an end of the first screw is mounted with a gasket and a positioning nut.

Further, the body buckle is parallel with the buckle board.

Further, the bracket body is provided with fixing holes, two ends of the slot are respectively provided with one fixing hole, a second screw for connecting with a part to be installed is provided inside the fixing hole.

Further, each end of the slot of the bracket body is respectively provided with a limit block.

Through the above technical solution, the present disclosure could easily operate the first screw from the side so that the rail bracket is clamped onto the rail to realize connection between the rail and a part, with the characteristics of simple structure, convenient installation, and low cost.

Figure 1:
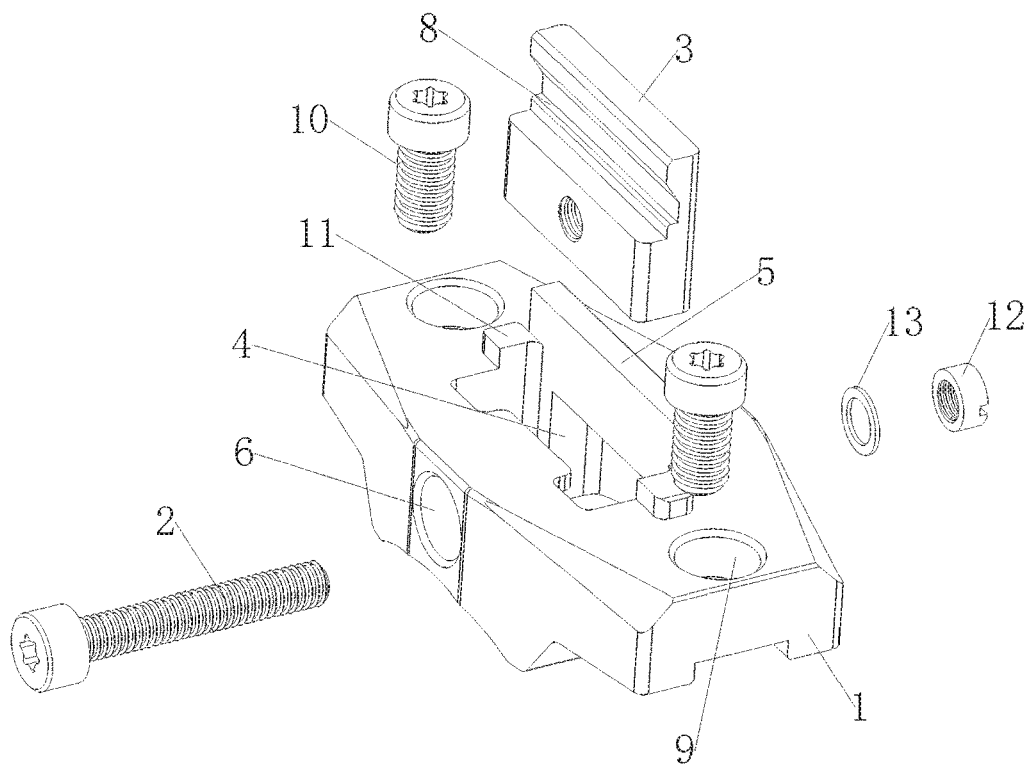
FIG. 1 is an exploded view of the present disclosure.
Figure 2:
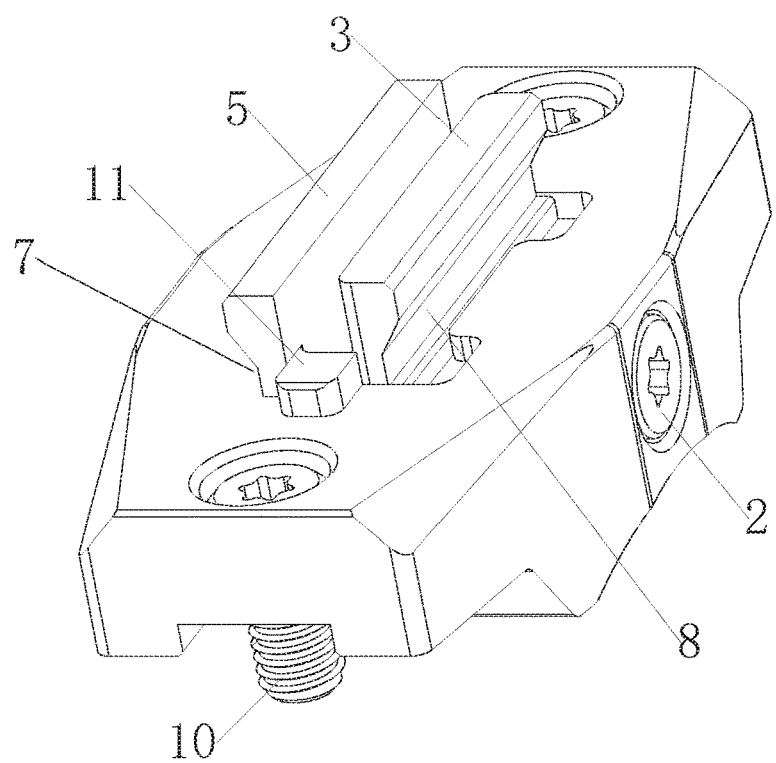
FIG. 2 is one structure view of the present disclosure.
Figure 3:
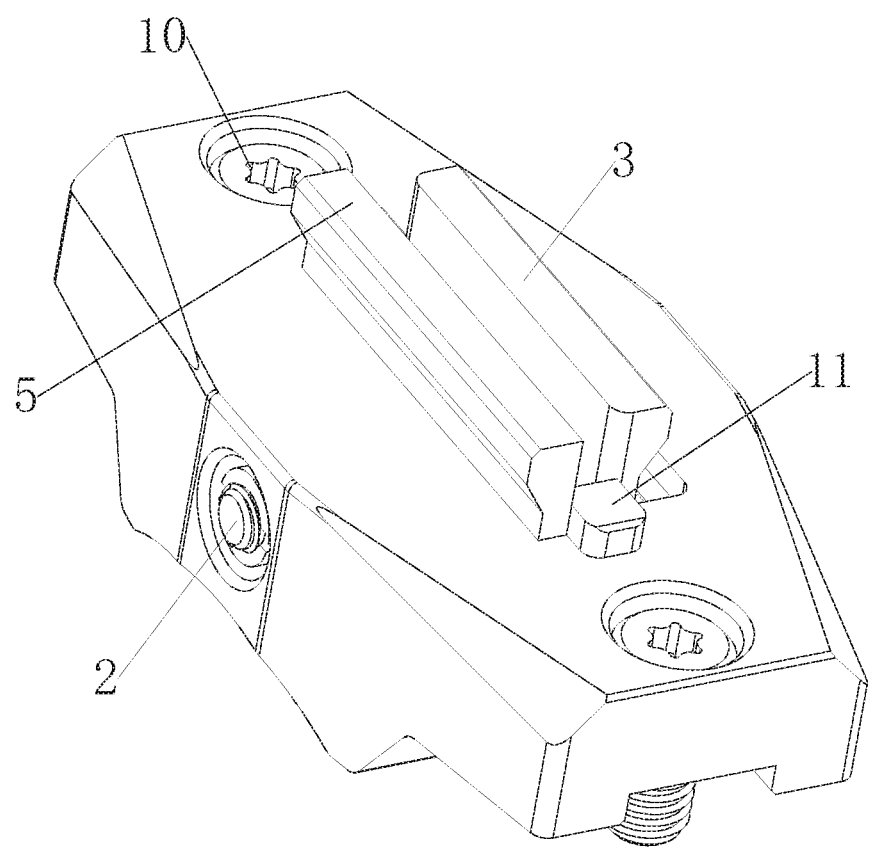
FIG. 3 is another structure view of the present disclosure.

REFERENCE NUMERALS 1, bracket body; 2, first screw; 3, buckle board; 4, slot; 5, body buckle; 6, through hole; 7, first rail clamping groove; 8, second rail clamping groove; 9, fixing hole; 10, second screw; 11, limit bump; 12, positioning nut; 13, gasket.

DETAILED DESCRIPTION OF THE EMBODIMENTS

In order to make the purpose, technical solution and advantages of the disclosure more clearly, the disclosure, combined with drawings and embodiments, will be further detailed. It should be understood that the specific embodiments described herein are intended only to explain the disclosure and are not intended to qualify the disclosure.

One aspect of the disclosure provides a rail bracket, especially for the Picatinny rail, which can be applied to firearms, toy guns, flashlights, and other fields.

The rail bracket includes: a bracket body 1, a first screw 2, and a buckle board 3. A slot 4 is provided at a side of the bracket body 1, the bracket body 1 protrudes to form a body buckle 5 at a first side of the slot 4, a through hole 6 is provided at a side wall of the bracket body 1, one end of the buckle board 3 is inserted into the slot 4, the first screw 2 inside the through hole 6 threadedly connects with the buckle board 3, the body buckle 5 is provided with a first rail clamping groove 7, the buckle board 3 is provided with a second rail clamping groove 8, the rail bracket clamps with a rail to be installed through the first rail clamping groove 7 and the second rail clamping groove 8, an end of the first screw 2 is mounted with a gasket 13 and a positioning nut 12. Preferably, the body buckle 5 is parallel with the buckle board 3. Due to the use of positioning nut 12, the first screw 2 can only be moved within a certain space and cannot be removed.

The slot is provided on the installed rail. When installed, a part to be installed onto the rail can be installed on the body buckle 5. Then, an end of the buckle board 3 is inserted into the slot 4, therefore the distance between the buckle board 3 and the body buckle 5 is reduced, so that the buckle board 3 and the body buckle 5 can be inserted into the slot of the rail at the same time. Then, the first screw 2 is inserted from the through hole 6 on a side of the bracket body 1 and threadedly connected with a screw hole on the buckle board 3. With the turning of the first screw 2, the buckle board 3 moves away from the body buckle 5 under the guiding action of the slot 4. Therefore, the distance between the first rail clamping groove slot 7 and the second rail clamping groove slot 8 is wider and wider, thus expanding outwards and eventually clamping two sides of the slot from the inside to the outside so as to connect with the rail.

Through the above technical solution, the present disclosure could easily operate the first screw 2 from the side so that the rail bracket is clamped onto the rail to realize connection between the rail and a part, with the characteristics of simple structure, convenient installation, and low cost.

Preferably, the bracket body 1 is provided with fixing holes 9, two ends of the slot 4 are respectively provided with one fixing hole 9, a second screw 10 for connecting with a part to be installed is provided inside the fixing hole 9.

Preferably, each end of the slot 4 of the bracket body 1 is respectively provided with a limit block 11, so that the width of the buckle board 3 and body buckle 5 is just less than the width of the slot on the rail but not too small, thus shortening the buckle board 3 in the travel of expansion process, improving efficiency, and saving installation time.

The embodiments described above represent only a few embodiments of the disclosure, its description is more specific and detailed, but cannot be understood as a limitation on the scope of the patent of the disclosure. It should be pointed out that for ordinary technical personnel in the art, without departing from the concept of the disclosure, you can also make a number of deformations and improvements, these are the scope of protection of the disclosure. Therefore, the scope of protection of the patent of the disclosure shall be subject to the attached claim.

What is claimed is:

1. A rail bracket comprising a bracket body, a first screw, and a buckle board, wherein a slot is provided in a side of the bracket body, the bracket body protrudes to form a body buckle at a first side of the slot, a through hole is defined in a side wall of the bracket body, one end of the buckle board is inserted into the slot, the first screw inside the through hole is threadedly connected with the buckle board, the body buckle is provided with a first rail clamping groove, the buckle board is provided with a second rail clamping groove, the rail bracket clamps with a rail to be installed through the first rail clamping groove and the second rail clamping groove, an end of the first screw is mounted with a gasket and a positioning nut;

wherein the bracket body is provided with fixing holes, two ends of the slot are respectively provided with one fixing hole, a second screw for connecting with a part to be installed is provided inside the fixing hole;

wherein each end of the slot of the bracket body is respectively provided with a limit block.

2. The rail bracket according to claim 1, wherein the body buckle is parallel with the buckle board.

\* \* \* \* \*